United States Patent [19]

Ito et al.

[11] 4,353,630
[45] Oct. 12, 1982

[54] EXPOSURE CONTROL DEVICE FOR A CAMERA HAVING A DIGITAL OPERATION DEVICE

[75] Inventors: Fumio Ito; Tadashi Ito, both of Yokohama; Soichi Nakamoto, Machida; Yasuo Isobe, Kawasaki, all of Japan

[73] Assignee: Canon Kabushiki Kaisha, Tokyo, Japan

[21] Appl. No.: 871,492

[22] Filed: Jan. 23, 1978

Related U.S. Application Data

[60] Division of Ser. No. 729,788, Oct. 5, 1976, abandoned, which is a continuation of Ser. No. 485,634, Jul. 3, 1974, abandoned.

[30] Foreign Application Priority Data

Jul. 4, 1973 [JP] Japan .................................. 48-75529

[51] Int. Cl.³ .............................................. G03B 7/14
[52] U.S. Cl. ........................................ 354/29; 354/38
[58] Field of Search ....................... 354/26, 27, 29, 36, 354/38

[56] References Cited

U.S. PATENT DOCUMENTS 3,829,867  8/1974  Ono ....................................... 354/29
3,886,568  5/1975  Yazaki et al. ........................... 354/27
4,045,807  8/1977  Ito et al. ................................. 354/38

Primary Examiner—Donald A. Griffin
Assistant Examiner—Stafford D. Schreyer
Attorney, Agent, or Firm—Toren, McGeady & Stanger

[57] ABSTRACT

A camera having an exposure control device in which various photographing informations are converted into digital amounts and supplied to a digital operation circuit and the exposure is controlled by the output of the operation circuit. The camera comprises a digital-analogue converter for converting diaphragm informations from the operation circuit into analogue diaphragm informations, a comparison means for comparing the analogue diaphragm informations from a photographing lens with the analogue informations from the above digital-analogue converter, and an alternating switch which supplies the informations from the photographing lens to the comparison means for shutter preference photographing, and supplies the analogue informations from the photographing lens to the analogue-digital converter for diaphragm preference photographing. The output of the analogue-digital converter is supplied to the operation circuit, and the shutter preference and diaphragm preference photographings is made possible by the changeover of the alternating switch.

3 Claims, 2 Drawing Figures

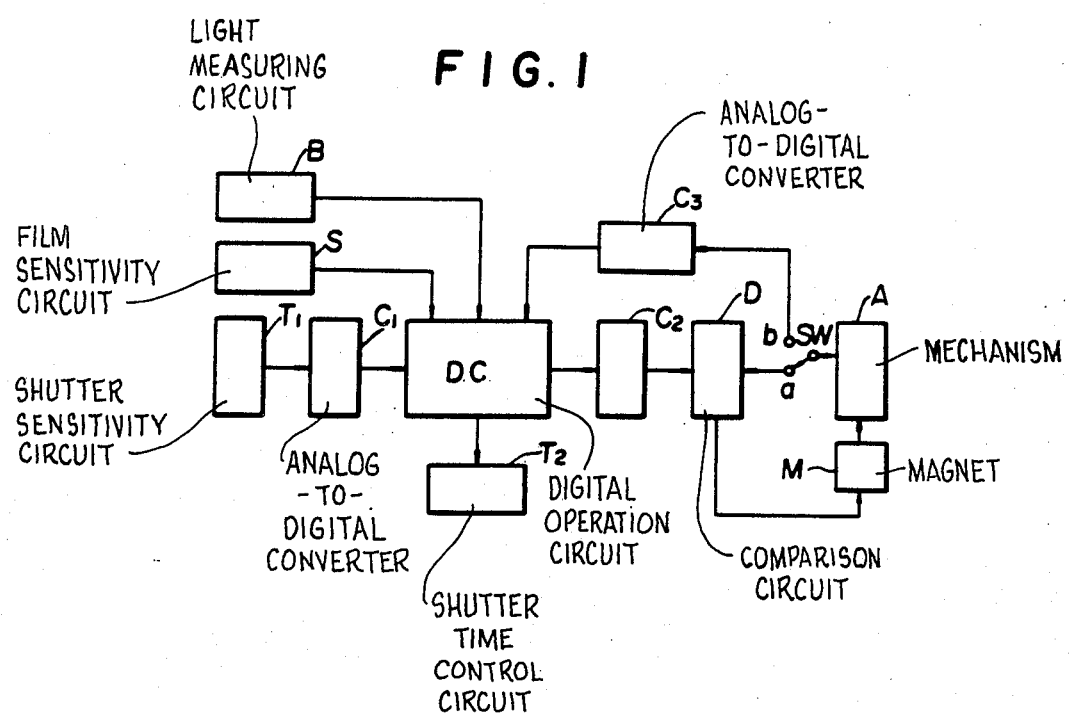

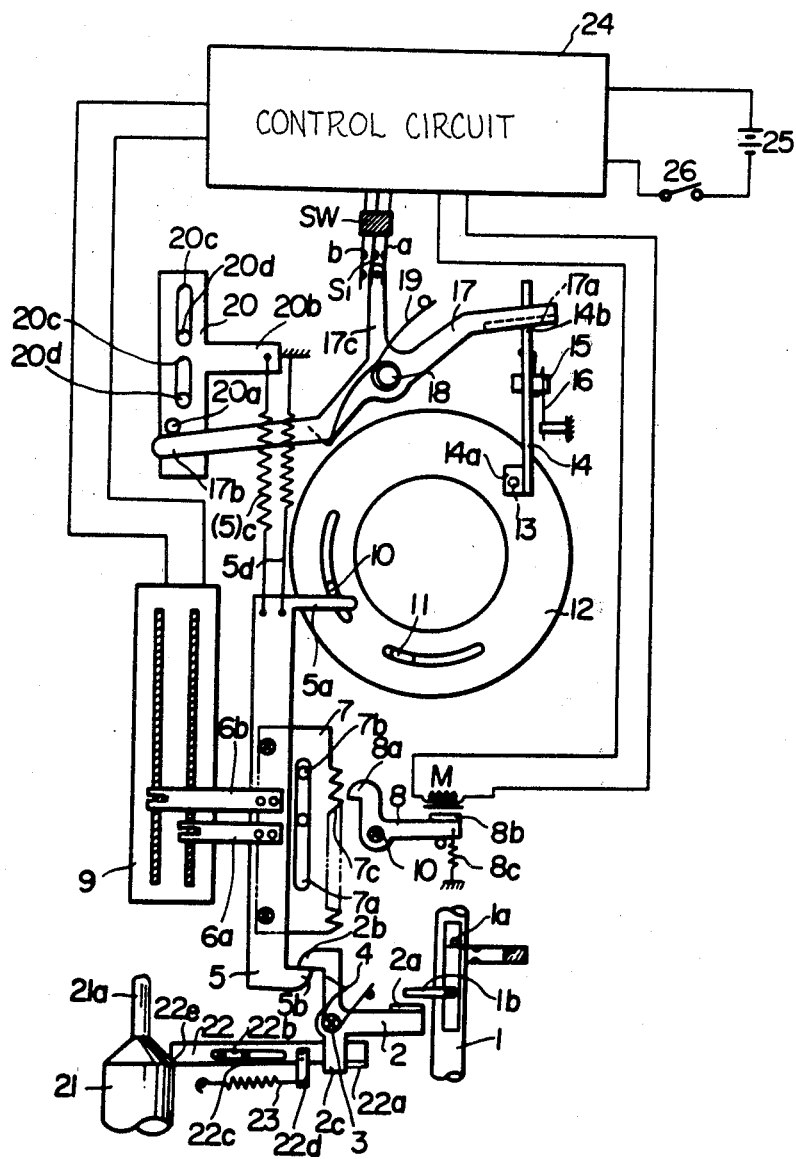

EXPOSURE CONTROL DEVICE FOR A CAMERA HAVING A DIGITAL OPERATION DEVICE

This is a division of application Ser. No. 729,788, filed Oct. 5, 1976, which is a cont. of Ser. No. 485,634, July 3, 1974, both abandoned.

BACKGROUND OF THE INVENTION

1. Field of the Invention

The present invention relates to an exposure control device for a camera having a digital operation device for digitizing various photographing informations, and particularly relates to an exposure control device which can perform both shutter preference photographing and a diaphragm preference photographing.

Description of Prior Arts

For determining the exposure amount in an auto-exposure control camera, there have been known a shutter preference EE camera and a diaphragm preference EE camera. In the former camera, the shutter time is previously set and a diaphragm value corresponding to a proper exposure is automatically set. In the latter camera the diaphragm value of the lens is set first, and then shutter time is set automatically. Both types of EE cameras have advantages and disadvantages, and it is hard to say which type is better. Thus, in some cases of photographing, effects by the shutter time difference are more important and in other cases, effects by the lens diaphragm are more important. All conventional cameras, single lens reflex cameras for example, adopt either of the two systems, and there is no conventional camera in which the two systems can be freely selected.

SUMMARY OF THE INVENTION

One object of the present invention is to provide an exposure control device in which both shutter-preference photographing and the diaphragm preference photographing are possible.

Another object of the present invention is to provide an exposure control device of very simple construction in which both of the two types of photographings are possible.

Other objects and features of the present invention will be clear from the following descriptions in reference to the attached drawings.

FIG. 1 is a diagram showing one example of the circuit structure of the exposure control device according to the present invention.

FIG. 2 shows main portions of one example of the diaphragm control section in the exposure control device according to the present invention.

DESCRIPTION OF PREFERRED EMBODIMENTS

In FIG. 1, B is a circuit for obtaining informations of brightness Bv of an object to be photographed, such as a light measuring circuit including a light receiving element, and Bv informations are output from its output terminal. S is a circuit for obtaining the information (Sv) of sensitivity of the film used. $T_1$ is a circuit for obtaining the shutter time informations (Tv) and its output is converted into a digital information by an analogue digital converter $C_1$. D·C is a digital operation circuit which receives digital photographing informations, namely Bv, Sv and Tv from B, S and $T_1$ and performs operation to output diaphragm informations Av. From the other output, shutter time informations Tv are output, thereby the shutter time control circuit $T_2$ is controlled. $C_2$ is a DA converter for converting the digital Av information from D·C, D is a comparison circuit, A is a diaphragm mechanism for the photographing lens, and its output is an analogue Av information, and M is a magnet which is actuated by the output of the comparison circuit D and locks the mechanism A. SW is a switch for changing over of the shutter preference and the diaphragm preference, and is shown in the drawing in the shutter preference state. $C_3$ is an AD converter which is used for converting the analogue Av informations from the mechanism A into digital informations to input them into the digital operation circuit D·C, and when the diaphragm preference state is taken, an analogue output from the mechanism A is input through the contact point b of the switch SW.

The operation of the device will now be described.

First, in the case of the shutter preference EE photographing, the switch SW is connected "a" by means of the signal pin of the lens when the diaphragm mechanism of the photographing lens is set to "auto". When any desired shutter time is selected by the shutter time setting mechanism, Tv informations are output from $T_1$ and converted by the AD converter into digital informations and input into the operation circuit DC. The object brightness informations from the photometric circuit and the film sensitivity informations are supplied to the operation circuit DC, and these informations are suitably digitized and supplied as Bv informations and as Sv informations. These three kinds of informations are subjected to digital operation by the operation circuit DC, which outputs the diaphragm information (Av information) as a digital information. This output is converted by the DA converter into an analogue information and supplied to one of the input terminals of the comparison circuit D. On the other hand, the analogue informations from the diaphragm information source A which associates with the lens diaphragm mechanism are supplied to the other input terminal of the comparison circuit D through the contact point "a" of the switch SW. When the diaphragm changes continuously in association with the shutter release, the Av informations also change continuously, and when this value becomes identical with output of the DA converter $C_2$ or when it reaches a difference corresponding to the originally set value, the magnet M is actuated by the output of the comparison circuit. By this magnet M, the lens diaphragm mechanism or the diaphragm presetting mechanism is locked and the exposure is determined. Under this condition, the shutter time control circuit $T_2$ is controlled by the Tv output of the operation circuit, and the shutter operates at a preset shutter time.

Next, in case of the diaphragm preference EE photographing, the switch is changed over to the contact point "b" by the signal pin of the photographing lens. When any desired diaphragm is set by the diaphragm mechanism, the analogue Av informations from the Av information source which associates with the diaphragm mechanism are input to the AD converter $C_3$ through the contact point "b" of the switch SW, and digital Av informations are output from the converter $C_3$. These digital informations are input to the operation circuit DC where they are subjected to digital operation together with the brightness informations (Bv) and the film sensitivity informations (Sv). In this case, the shutter time informations (Tv) are not supplied to the operation circuit since the shutter time setting dial is set to "auto". The operation circuit outputs Tv informations by which the shutter time control circuit is controlled to produce a proper exposure amount. The Av output from the operation circuit DC is supplied to the comparison circuit D through the DA converter C2, but the magnet M does not operate because of the absense of the other input, thus the diaphragm mechanism A is never locked by the diaphragm mechanism A.

Next, reference is made to FIG. 2 which shows the structure of one embodiment of the present invention in which a diaphragm control section is added to the exposure control device shown in FIG. 1. In the drawing, the device is shown in a state where the shutter button is about to be pushed down for shutter time preference EE photographing. 1 is a release bar which associates with the shutter release button and is provided with projections 1a and 1b. This bar effects opening and closing of a power source switch 26 with the projection 1a and engages with one end 2a of a fixing lever 2 which is supported rotatably by a shaft 3 and is provided with a claw 2b and an engaging end 2c. This fixing lever 2 is biased by a spring 4 in a counter-clockwise direction. 5 is a diaphragm lever, which moves to the lowest end in association with the shutter charging and is also manually movable to the lowest end. This diaphragm lever 5 is provided with an engaging end 5a and a claw 5b, is integral with a member 7 having contacting plates 6a and 6b and a saw-tooth portion 7c, and is movable up and down by means of an elongated opening 7a and a pin 7b. The claw 5b of the diaphragm lever 5 is engageable with the claw 2b of the fixing lever 2, and the lever 5 and the member 7 are biased upward by the springs 5c and 5d. 8 is a lock lever having a claw 8a engagable with the saw-tooth portion 7c, and biased by a spring 8c rotatably around the shaft 10 in a clockwise direction. M is a magnet which is excited by the output of the comparison circuit D ahd works on the bent portion 8b of the lock lever 8. 9 is a print sheet forming a variable resistor for obtaining the diaphragm informations, which contacts with the movable contactors 6a and 6b. 12 is a barrel for the photographing lens, and 10 is a diaphragm preset lever biased by a weak spring rotatably in a counter clockwise direction within the barrel, and engageable with the end 5a of the diaphragm lever 5. 11 is an automatic diaphragm lever, and 13 is a signal pin which detects and indicates whether the diaphragm of the photographing lens is at "auto" or "manual," and projects upward in the drawing when the diaphragm is at "auto". 14 is a change-over signal lever supported by the shaft 15, and biased by a spring 16 to engage with the signal pin 13 at its bent portion 14a and engage with the inclining portion 17a of an intermediate lever 17 at its inclining portion 14b. This intermediate lever 17 is supported rotatably by the shaft 18 and biased by the spring 19 to rotate in a clockwise direction, and operates in correspondense to the movement of the signal lever 14 to transfer the movement of the intermediate lever 20 to the change-over lever 20 by means of its one end 17b and 17c through a pin 20a planted on the lever 20 and to act on the switch SW to effect the change-over of the contact point. The change-over lever 20 is guided by the elongated opening 20c and the pin 20d, and is connected to the diaphragm lever 5 at its end 20b by the spring 5c. 21 is a change-over bar which associates with the change-over lever 20 and is provided with a tapered portion 21a which contacts with a inclining portion 22c of a plate 22 which is guided by the elongated opening 22b and the pin 22c and is biased laterally by a spring 23 provided at its projection 22d. This plate 22 is also provided with a bent engaging portion 22a at one end for engagement with the engaging end 2c of the fixing lever 2. 24 is the control circuit shown in FIG. 1, 25 is a power source battery and 26 is a power source switch.

Next, explanations will be made on operations of the device shown in FIG. 2.

First, in case of the shutter preference EE photographing, when the shutter release bar 1 is pushed down, the switch 26 is made "on" and the control circuit 24 gets into an operative state and the shutter rear blade is held by a magnet (not shown). When the release button is further pushed down, the projection 1b of the button 1 acts on the fixing lever 2 to rotate the lever 2 in a clockwise direction and disengage the claw 2b and the claw 5b, thereby liberating the diaphragm lever 5. The diaphragm lever 5 is slided upward by a strong spring 5c and a weak spring 5d. Thus, the diaphragm preset lever 10 of the photographing lens 12 is moved and the resistance value of the variable resistor provided on the print sheet 9 is changed thereby to input the resistance value change corresponding to the sliding movement of the diaphragm lever 5 to the control circuit 24. The diaphragm information from the photographing lens are compared with the diaphragm informations operated from the Tv. Bv and Sv informations coming from respective information sources in FIG. 1, and when the both informations coincide or they reach the originally set value, the magnet M is excited by the output of the comparison circuit. Thereby, the bent portion of the lock lever 8 is rotated in a counter clockwise direction against the spring 8c to lock the member 7 integrated with the diaphragm lever 5 by means of the saw-tooth portion 7c and the claw 8a. Thus, the diaphragm preset lever 10 is held at the then position and the preset diaphragm value is determined. When the shutter bar 1 is still further pushed down, a lever not shown is actuated and the diaphragm of the photographing lens is stopped down to a preset diaphragm value. Then the front screen of the shutter is started, the shutter time is controlled by the Tv information from the operation circuit 24, and then the magnet holding the rear screen is deactuated to run the rear screen. Then the mirror restores and the automatic diaphragm lever 11 is liberated. When the push-down of the releave bar 1 is stopped, the power source switch 26 becomes "off," the magnet M stops its operation and the lock lever 8 is rotated in a clockwise direction by the spring 9 to release the lock. When the lock is released, the diaphragm lever 5 is moved by the spring 5c to the uppermost end limited by the diaphragm preset lever 10 and stops there. For preparation of the next photographing, the diaphragm lever 5 is pushed down to the lowest end by a winding-up member (not shown) and is held by the engagement of the claws 2b and 5b. Also the diaphragm preset lever 10 is moved to the lowest end together with the end 5a of the diaphragm lever 5 and restores the state shown in FIG. 2.

In case of the diaphragm preference EE photographing, a diaphragm ring (not shown) of the photographing lens 12 is set to a desired diaphragm value other than the "auto." Thereby the signal pin 13 is drawn back, the change-over signal lever 14 is rotated by the spring 16, and the intermediate lever 17 rotates in a counter clockwise direction against the spring 19 so that the switch SW is changed over from the contact point "a" to the contact point "b" by one end 17c of the intermediate lever 17. Also the change-over lever 20 is moved downward by the spring 5c as the intermediate lever 17 rotates in a counter clockwise direction and finally lowers to a position where the biasing force of the spring 5c exits no more. Also the change-over bar 21 which is in association relation with the change-over lever 20 lowers os that the plate 22 is moved right and left by the spring 23 to rotate the fixing lever 2 in a clockwise direction. Thereby the engagement between the claw 2b of the lever 2 and the claw 5b of the diaphragm lever 5 is released, and the diaphragm lever 5 follows the diaphragm preset lever 10 by means of the weak spring 5d. The force of the spring 5d is not so strong as to move the diagphragm preset lever 10, and adjusted to a degree only enough for the member 5a to follow the lever 10. Therefore, when a desired diaphragm value is set by the diaphragm ring, the diaphragm preset lever 10 as well as the diaphragm 5 stops a respective position corresponding to the diaphragm value thus set.

After the change-over is made for the diaphragm preference EE photographing as above, when the shutter button is pushed down while the shutter dial is set to the "auto", the shutter releave bar 1 is pushed down, the power source switch 26 becomes "on," the control circuit 24 is actuated and the magnet (not shown) for the rear screen is excited.

Under this conditions, the fixing lever 2 has been already rotated in a clockwise direction by the plate 22 and thus its engagement with the diaphragm lever has been released, and the diaphragm lever has followed the position of the diaphragm preset lever 10, so that the variable resister of the print sheet 9 takes a resistance value corresponding to the set diaphragm value, which resistance value input to the control circuit 24. Also as the switch SW has been changed over to the contact point "b" by the counter clockwise rotation of the intermediate lever 17, the diaphragm information is subjected to AD conversion and input to the operation circuit DC. The operation is effected by the Av information and the Bv and Sv informations to output the shutter time information (Tv information). In this case, however, as the shutter dial is set at "auto," the Tv information is not input to the operation circuit. The operation circuit outputs the Av information which is input to the comparison circuit D through the AD converter, but no information to be compared is input to the other terminal of the comparison circuit D, and the diaphragm value is maintained at the original value. When the shutter bar 1 is further pushed down, the mirror-up and the stopping-down of the lens are effected by a conventionally known method, the shutter front screen runs, the magnet for the shutter rear screen is de-excited after the time period determined by the output Tv information of the operation circuit, and the rear screen runs to finish the exposure. With the signal of the completion of the rear screen running, the mirror restores and the stopping-down is released by a conventional method, and the power source switch 26 becomes "off" with the release of the shutter button and the circuit becomes non-operative. The diaphragm lever 5 moves to the lowest end in association with the shutter charge for the next photographing, and the diaphragm lever 5 rises up to the position of the diaphragm preset lever 10 by the force of the spring 5d to finish the diaphragm preference EE photographing.

For the change-over from the diaphragm preference EE photographing to the shutter preference EE photographing, the diaphragm ring is set to the position of "auto" to project the signal pin 13 and rotate the change-over signal lever 14 against the spring 16. Thereby the intermediate lever 17 is rotated in a clockwise direction by the spring 19 and the change-over switch SW is change over the "a" side by its one end 17c and the change-over lever 20 is moved upward by its other end 17c, so that the change-over bar 21 which associates with the change-over lever 20 is raised, the plate 22 is moved to the right and the fixing lever 2 is rotated in a clockwise direction by the spring 4 to a position which permits the engagement between the claws 2b and 5b. However, the diaphragm lever 5 is also raised to the uppermost end together with the diaphragm preset lever 10, and therefore the lever is lowered manually until the claws 5b and 2b engage. By this lowering, the diaphragm preset lever 10 follows the diaphragm lever by the aid of the spring within the photographing lens and moves to the lowest end. Under this condition, if the shutter dial is set to a desired value, the device restores the state as shown in FIG. 2 to complete the preparation of the shutter time preference EE photographing.

As described above, the change-over between the shutter preference EE photographing and the diaphragm EE photographing is effected very simply by the signal from the photographing lens, namely the automatic or manual change-over operation of the diaphragm ring in the exposure control device according to the present invention, and this gives great advantages in the camera operation.

What is claimed is:

1. In a camera operable both in a shutter time preference mode and in a diaphragm preference mode, having diaphragm control means which is provided with two input terminals to determine an aperture size of a taking lens by comparing two input signals applied through the two input terminals and shutter control means which determines an exposure time based on an input signal, the improvement comprising:
    (a) diaphragm value producing means for producing an electrical signal corresponding to the aperture size, the diaphragm value producing means having an output for providing said signal; and
    (b) change-over switch means which connects the output of said diaphragm value producing means to one of the two input terminals of said diaphragm control means for applying an instantaneous value indicating the aperture size to said diaphragm control means when the shutter time preference mode is selected, and which operatively connects the output of said diaphragm value producing means to an input receiving stage of said shutter control means for applying a diaphragm value indicating the aperture size preferentially set when said diaphragm preference mode is selected.

2. A camera according to claim 1, wherein said diaphragm value producing means is associated with a diaphragm aperture preset lever.

3. A camera according to claim 1, wherein said diaphragm value producing means includes a resistor.

* * * * *